Oct. 26, 1954     R. A. VAN NORDSTRAND     2,692,497
ADSORPTION ISOTHERM DETERMINATION
Filed March 8, 1949                                          3 Sheets-Sheet 1

INVENTOR.
Robert A. Van Nordstrand
BY
Jenny Edmond Norton and Barrows
ATTORNEYS

Oct. 26, 1954   R. A. VAN NORDSTRAND   2,692,497
ADSORPTION ISOTHERM DETERMINATION
Filed March 8, 1949   3 Sheets-Sheet 2

INVENTOR.
*Robert A. Van Nordstrand*
BY
*Pennie, Edmonds, Morton and Barrows*
ATTORNEYS

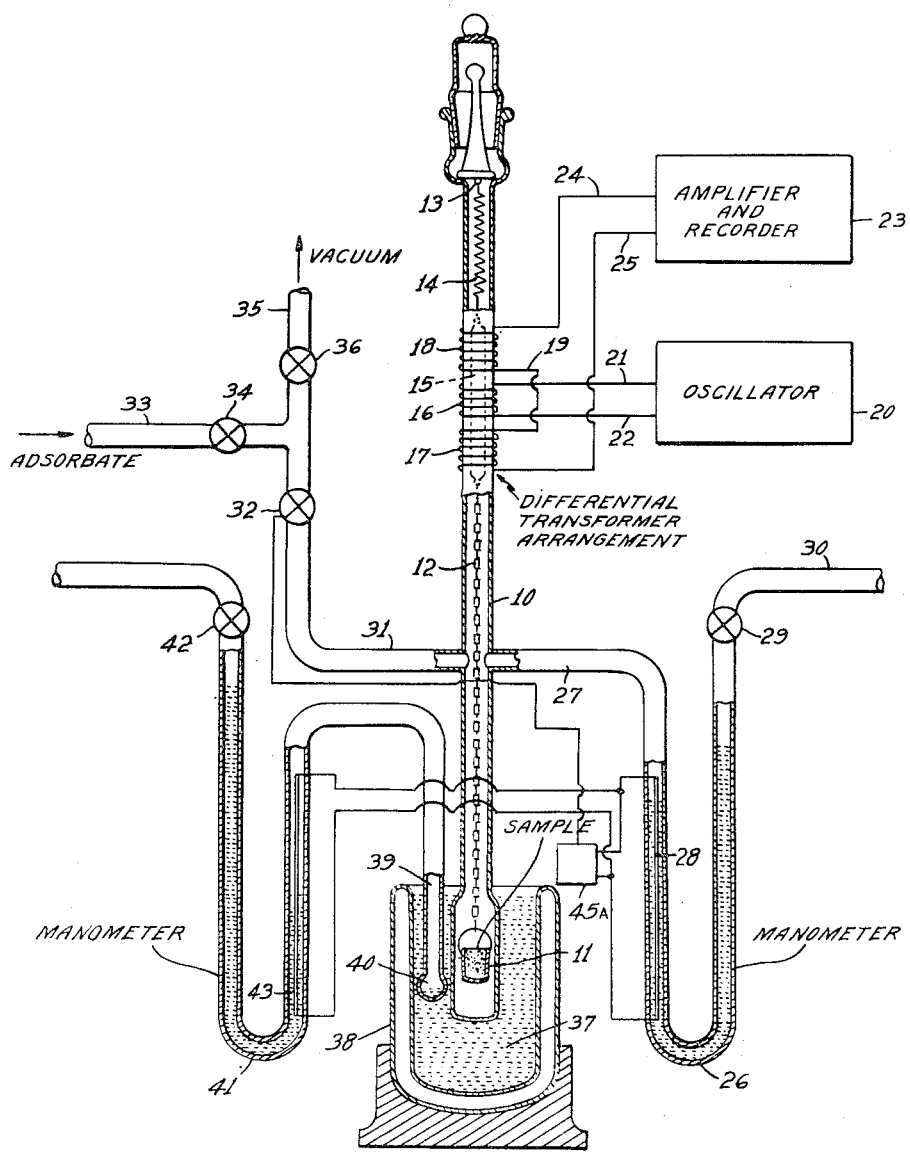

UNITED STATES PATENT OFFICE 2,692,497

ADSORPTION ISOTHERM DETERMINATION

Robert A. Van Nordstrand, Flossmoor, Ill., assignor, by mesne assignments, to Sinclair Research Laboratories Inc., Harvey, Ill., a corporation of Delaware Application March 8, 1949, Serial No. 80,257

12 Claims. (Cl. 73—19)

This invention relates to the characterization of solids. More particularly, the invention pertains to a novel apparatus for evaluating numerous physical properties of finely divided or porous solids, for example, surface area, by means of adsorption isotherms.

Adsorbents, catalysts, pigments, charcoals, carbon blacks, and other similar substances may be effectively characterized by so-called adsorption isotherms. In particular, the adsorption isotherm of a given solid may be readily interpreted by those versed in the art so as to evaluate its more important physical properties, such as surface area, pore volume, average pore diameter, and the distribution of pore diameters.

Essentially, an adsorption isotherm is a relationship expressing, as a function of pressure, the amount of a particular gas or vapor adsorbed on a certain amount of a given solid at a fixed temperature. Symbolically, it may be expressed as:

$$S = f_T(p)$$

where S is the amount of gas or vapor adsorbed per gram of solid expressed either in cubic centimeters at standard temperature and pressure, in moles, or in grams; $p$ is the pressure either in millimeters of mercury, in atmospheres, or in the fractional part of the saturation pressure at the fixed temperature; and $f_T$ denominates the functional relationship at a fixed temperature, T.

In general, the term "adsorption isotherm" refers to the two "branches" of the isotherm. In particular, the "adsorption branch" is determined by starting with a solid free of any adsorbed gas and adding successive amounts of a specific gas to that solid, while the "desorption branch" is determined by commencing with a solid saturated with a gas and withdrawing or desorbing successive amounts of the gas from the solid. Frequently adsorption isotherms are multiple-valued functions. Over pressure ranges where these two curves are not identical, the system is said to exhibit hysteresis.

Adsorption isotherms have been determined conventionally, among other ways, by measuring the volume of a gas adsorbed by a given solid at various pressures. This practice requires an initial calibration of the "dead space" in a vacuumtight chamber containing the solid. Following the calibration, a small measured volume of the gas is admitted to the chamber, equilibrium effected, and the pressure inside the chamber read from a manometer. It is then possible to calculate the amount of the particular gas adsorbed on the solid at this pressure. Accordingly, by repeatedly adding successive volumetrically measured amounts of the gas, a series of values for adsorption as a function of pressure at a fixed temperature are obtained, and thus, sufficient data for an adsorption isotherm are made available. In addition, gravimetric methods for determining the amount of a specific gas adsorbed on a solid have been proposed, as by using a "traveling" microscope to observe the extension of a coiled spring-type balance made of very fine wires of silica or Phosphor-bronze. However, in either case, the apparatus and method involves a manual operation and requires a lengthy manipulation, a high degree of skill and judgment, and the constant attention of a skilled chemist and other specially trained laboratory workers.

I have discovered that data for adsorption isotherms may be simply, speedily, and accurately obtained by a novel automatic apparatus which essentially comprises introducing a controlled amount of a gas to a finely divided or porous solid initially in vacuo, the gas being adsorbed at a continuous rate sufficiently low so that equilibrium is closely approximated at all times and recording at least one of the variables consisting of the weight of the gas adsorbed and the pressure of the environment of the solid.

My apparatus for obtaining adsorption isotherm data is essentially automatic and only requires the limited attention of a laboratory technician. On the other hand, the conventional manual procedure, described hereinbefore, requires the constant surveillance of a skilled chemist aided by experienced laboratory technicians. In addition, my invention greatly expedites obtaining adsorption data since only a fraction of the time required in existing practices is necessary for a single determination. Thus the commercial value of my apparatus and procedure is considerable since the accuracy of the adsorption data obtained is substantially enhanced, the length of the operation greatly reduced, and the degree of skill required for manipulation materially lessened.

The apparatus for obtaining data for adsorption isotherms encompassed by my invention may be varied in several ways. For instance, the gas inlet rate may be so controlled that the pressure is made directly proportional to the period of time elapsed, while the weight of the gas adsorbed is recorded under conditions so that equilibrium is closely approximated at all times. This continuous determination may be reduced to the following equations:

(1) $\quad p = kt$
(2) $\quad S = g_T(t)$
(3) $\quad S = f_T(p)$ where $t$ is equal to the time elapsed, $k$ is a constant, $g_T$ and $f_T$ denominate functional relationships at a fixed temperature T, and the remaining terms are defined as previously indicated. The gas inlet rate is so regulated that $p$ is made directly proportional to $t$, S is recorded, while Equation 3 represents the desired isotherm obtained from (1) and (2).

Or the gas inlet rate may be controlled so that the weight of the gas adsorbed is made directly proportional to the elapsed time, while the pressure is recorded under conditions so that equilibrium is closely approximated at all times. Reduced to equations, this continuous determination is represented in terms hereinbefore defined as follows:

(4) $\qquad S=kt$
(5) $\qquad p=g_T(t)$
(6) $\qquad S=f_T(p)$ wherein S is controlled, $p$ is recorded, and Equation 6 is the desired isotherm obtained from (4) and (5).

In addition, the rate of the gas inlet may be arbitrarily fixed at a low rate so that equilibrium is closely approximated at all times and the pressure and weight of the gas adsorbed recorded simultaneously as functions of the time elapsed. This continuous determination may be reduced to the following equations:

(7) $\qquad p=g_T(t)$
(8) $\qquad S=h(t)$
(9) $\qquad S=f_T(p)$ where $h$ is a constant, and the remaining terms are as already defined. S and $p$ are recorded and then are replotted manually as Equation 9. Or the weight of the gas adsorbed may be recorded directly as a function of the pressure, in which case both the pressure and the weight of the gas adsorbed may be made the means for operating the recorder, the time parameter being eliminated.

Thus my invention includes an apparatus directed to the automatic recording of adsorption and desorption isotherm data wherein the adsorbate, or gas, is admitted to the adsorbent, or finely divided solid, at an arbitrarily fixed rate and the pressure and the weight of the gas adsorbed recorded simultaneously; in the alternative, the adsorbate may be admitted to the adsorbent at a rate so controlled as to render the mass adsorbed directly proportional to the time elapsed, the pressure in this instance being recorded as a function of time. Further, the adsorbate may be admitted to the adsorbent at a rate controlled automatically so that the pressure is made directly proportional to the time elapsed and the mass adsorbed recorded as a function of time. In all cases admission of the gas is controlled so that equilibrium is closely approximated.

Figures 1, 2 and 3 illustrate embodiments of my invention wherein the apparatus identified employ a nitrogen gas adsorbate and a liquid nitrogen bath for maintaining the solid which is to be characterized at a constant temperature. However, my invention is generally adaptable to the adsorption by a finely divided or porous solid of a gas the boiling point of which is below about 120° C.

Figure 1 illustrates a somewhat schematic embodiment of my invention wherein the rate of gas inlet is arbitrarily fixed at a low rate so that equilibrium is closely approximated at all times, and the pressure and weight of the gas adsorbed are recorded simultaneously as functions of time. This arrangement is predicated upon the preceding formulae 7, 8, and 9.

Figure 1:
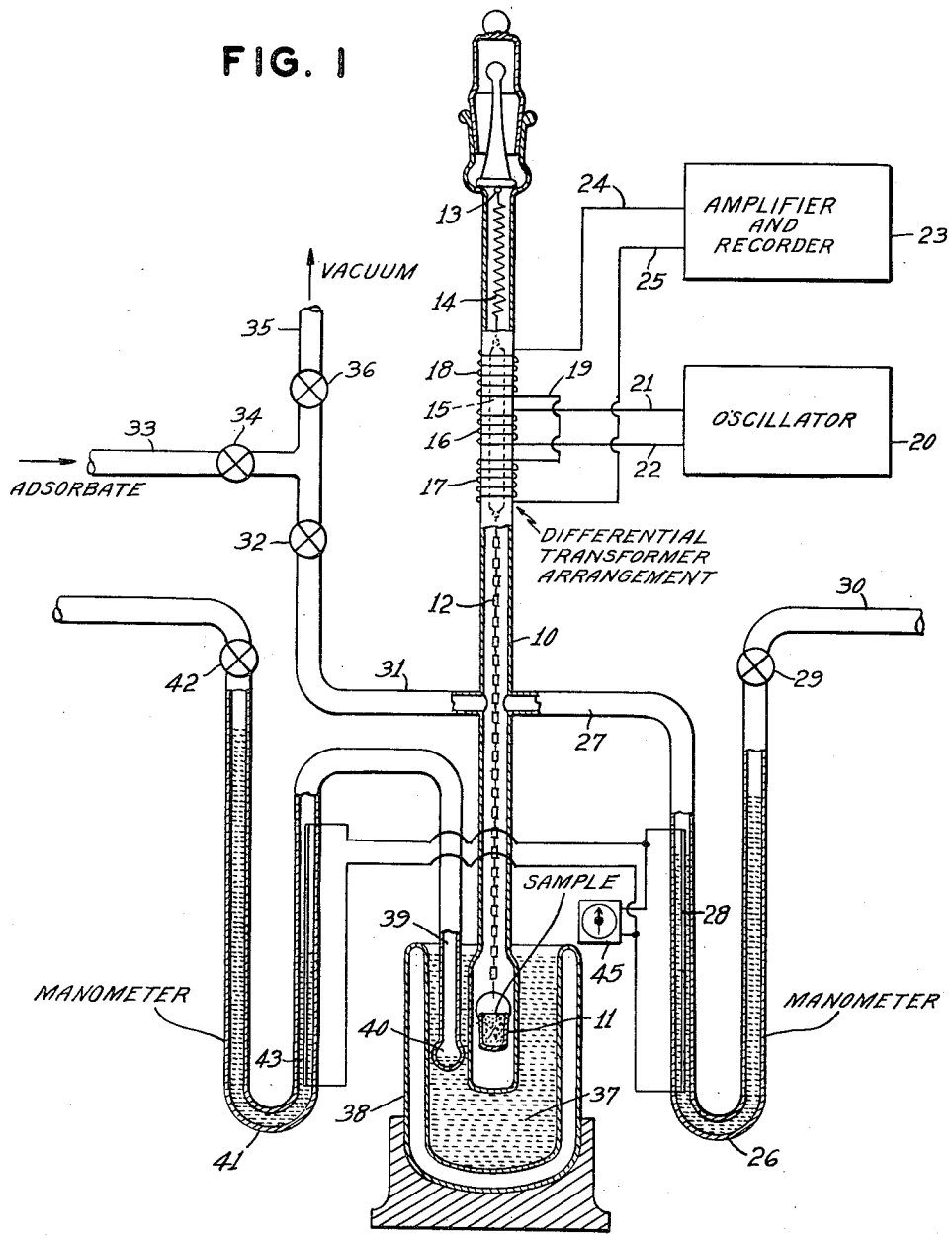

Essentially, the embodiment illustrated in Figure 1 comprises a vacuum-tight envelope 10, advantageously made of glass, in which is located the adsorbent in a holder 11 affixed to support chain 12. The chain is attached to the top of the envelope at a hook 13 and contains in its length coil spring 14 and magnetic core 15. The magnetic core is preferably made of a magnetic material such as soft iron, while the coil spring is advantageously composed of a sensitive, elastic metal. Wound around the outside of the envelope at the approximate location of the magnetic core 15, so as to provide an adjustable or slightly movable differential transformer, are a primary coil 16 and split secondary coils 17 and 18, the latter connected differentially by wire 19. The primary coil 16 is supplied with alternating current advantageously derived from oscillator 20, which is connected to said coil by lead wires 21 and 22. As a result, a secondary current is recorded from the secondary coils 17 and 18 by a recorder connected with an amplifier through lead wires 24 and 25, most satisfactorily made up in one unit 23. The envelope 10 is connected to a mercury manometer 26 by line 27 so as to provide a means for recording the pressure in the envelope. The manometer 26, containing sealed-in resistance wire 28 leading to recorder 45, is connected to a vacuum manifold (not shown) through valve 29 and line 30. Also connected to the envelope, by means of line 31 and leak valve 32, are line 33 from the nitrogen gas reservoir, regulated by valve 34, and a line 35 from a vacuum manifold (not shown), regulated by valve 36. The lower section of the glass envelope, i. e., that section containing the adsorbent, is immersed in a liquid nitrogen bath 37 within a thermal-insulating container 38, most advantageously a Dewar container. The temperature of the liquid nitrogen bath is measured by a vapor pressure thermometer 39 comprising a tube, the sealed end 40 of which is located in the liquid nitrogen at a point as close as possible to the adsorbent. The tube leads to a mercury manometer 41 which in turn is connected to a vacuum manifold (not shown) through valve 42. The level in the manometer column is recorded by means of a resistance wire 43 sealed within the tube, which wire leads to recorder 45. The purpose of the vapor pressure thermometer is to correct the pressure readings for changes in the temperature of the thermostat bath. Recorder 45 is so wired that the ratio of the pressure, $p$, of the environment of the finely divided or porous solid to the vapor pressure, $p_0$, in the thermometer is directly recorded as $p/p_0$.

To record adsorption data, the apparatus is operated automatically as follows: To provide a satisfactory starting point, the adjustable differential transformer is "zeroed." Then valve 34 controlling the nitrogen gas inlet is opened while valve 36, leading to the vacuum manifold, is closed. Leak valve 32 is opened and so regulated as to admit nitrogen gas at an arbitrarily slow rate in order that equilibrium is closely approximated at all times. The nitrogen then passes into the glass envelope 10 and to the adsorbent in holder 11 wherein it is adsorbed. The increased weight of the sample extends the coil wire 14 thereby effecting a movement in the magnetic iron core 15 within the glass envelope 10. This movement in the core alters the current flow in the differential transformer arrangement and, accordingly, actuates the amplifier and recorder 23. More specifically, the oscillator 20 advantageously supplies a current between about 60 to 500 cycles per second to the primary coil 16 and measurement of a displacement within the range of 0 to 0.12 inch is recorded in recorder 23 by means of the current out of secondary coils 17 and 18. At the same time the pressure in the system is measured by means of the mercury manometer 26 by recording the height of the mercury column in manometer 26, viz., that part of the sealed-in resistance wire 28 originally shorted out functions as an active resistance by an alteration in the height of the mercury column in the right-hand tube of the manometer, and is measured by a current flow from the recorder 45.

Thus the weight of the gas adsorbed by the solid S, and the pressure within the envelope $p$, are recorded simultaneously as functions of the time elapsed $t$, at a constant temperature T, and S is then replotted manually as a function of the pressure and is the desired isotherm. Buoyancy corrections may be made at this time if required for suitable accuracy.

To record desorption data following the recording of the adsorption branch of the isotherm, the apparatus is operated automatically as follows: The nitrogen gas inlet is disconnected from the system by closing valve 34, while the vacuum manifold is cut in by opening valve 36. The movement of the holder 11 is then recorded along with the pressure on the system by substantially the same procedure as that employed for adsorption data except that gas is withdrawn from the system instead of being admitted.

Figure 2:
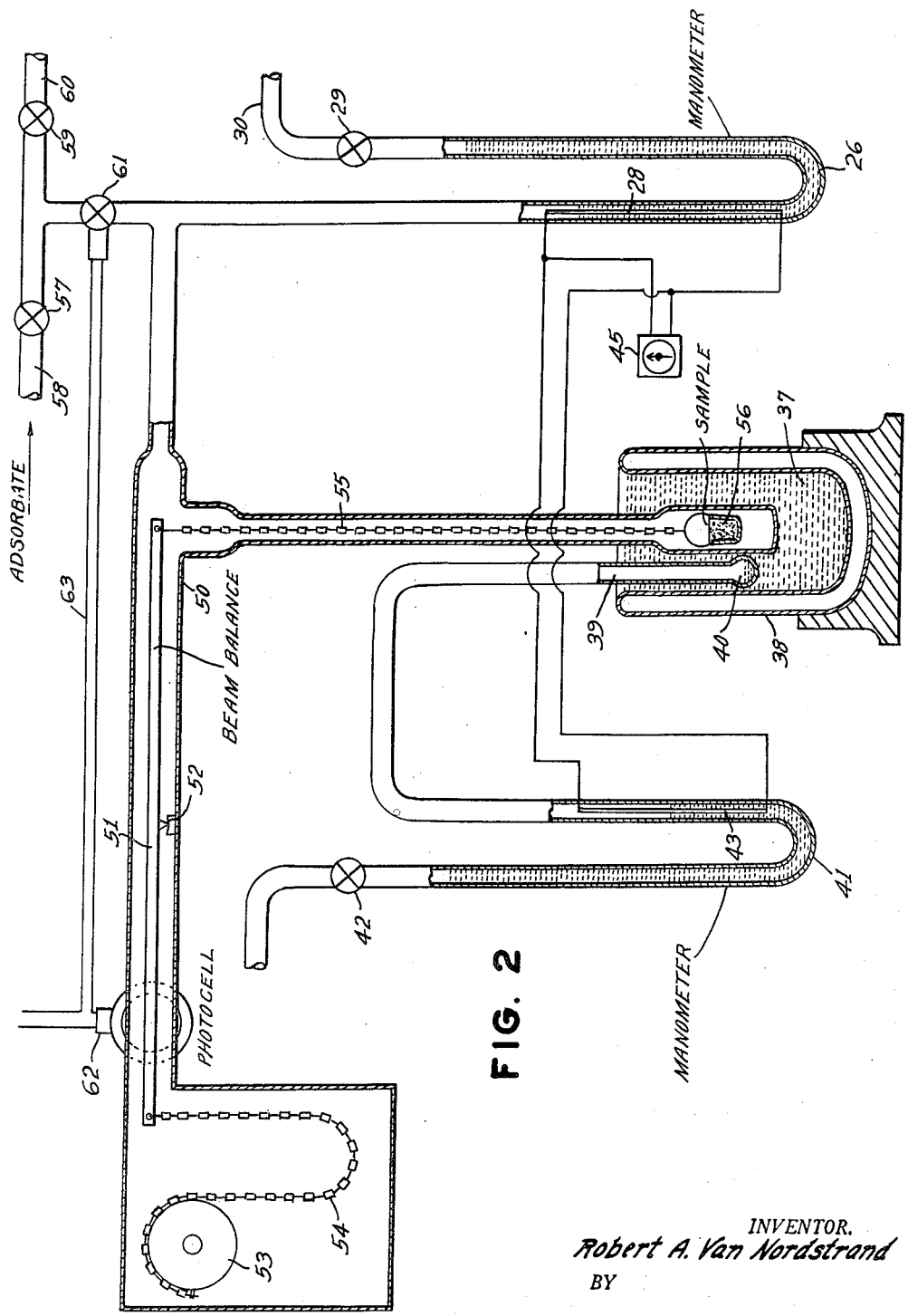

Figure 2 illustrates a somewhat schematic embodiment of my invention wherein the fluid inlet rate is so controlled that the weight of the vapor adsorbed by the finely divided or porous solid is made directly proportional to the time elapsed. In this arrangement the pressure is recorded; the embodiment is predicated upon the preceding Formulae 4, 5, and 6.

Essentially, the embodiment illustrated in Figure 2 comprises a vacuum-tight envelope 50, advantageously made of glass, within which there is a beam balance 51 supported on a knife edge 52 and a clock-type motor turning drum 53 which adds chain 54 to the left side of the beam at a uniform rate. Attached to the right side of the beam balance by chain 55 is a container 56 holding the adsorbent. The envelope at this point is immersed in a thermal-insulating container 38, preferably filled with liquid nitrogen 37, substantially as illustrated in the preceding drawing. The temperature of the nitrogen bath is measured by a vapor pressure thermometer 39 which includes a sealed glass tube 40 immersed in the bath and attached to mercury manometer 41. The pressure in the manometer is converted to an electric signal by means of resistance wire 43 sealed within the tube. This electrical signal, proportional to the pressure, $p_0$, in this vapor pressure manometer, is applied to recorder 45 as a temperature correction on the pressure $p$, being recorded from manometer 26. Thus the actual recording is of the ratio $p/p_0$. The manometer 41 is connected to a vacuum manifold (not shown) by means of valve 42 while the second mercury manometer 26, attached to the envelope, also leads to a vacuum manifold (not shown), through valve 29 and line 30, substantially as illustrated in Figure 1. This manometer contains sealed-in resistance wire 28 which is connected to a recorder 45. The nitrogen gas is admitted to the envelope by means of line 58 through valve 57. The vacuum manifold (not shown) is connected to the system by means of valve 59 and line 60. The admission of the gas is regulated by leak valve 61 which is operated through connection 63 by a motor controlled by photocell 62 in the path of a light beam which is intercepted in part by the balance of the beam. The photocell-light combination is located advantageously at the extremity of the left side of the beam balance so as to be actuated by any slight movement in that balance.

To record adsorption data, the apparatus is operated automatically as follows: Valve 57 is opened thereby admitting the nitrogen gas, while valve 59 is closed. The beam is initially balanced and the chain 54 is added at a uniform rate by starting the clock-type motor turning drum 53. This weight then moves the beam balance which in turn causes the photocell 62 to operate the motor regulating leak valve 61. The nitrogen gas is thus adsorbed by the solid in the glass envelope in an amount that is directly proportional to the time elapsed due to the uniform operation of the clock motor 53 adding the chain weight 54. The pressure is recorded by means of the mercury manometer 26 containing sealed-in resistance wire 28 leading to a recorder 45. This is the desired isotherm, since the mass adsorbed is proportional to time.

To record desorption data, following the recording of the adsorption branch of the isotherm, the apparatus is operated as follows: Valve 57, admitting nitrogen gas, is closed while valve 59 to a vacuum manifold is opened. The clock motor direction is reversed so that the turning drum 53 removes weight from the beam 51. The direction of control of the photocell 62 is changed so that the control leak valve 61 is opened wider when the adsorbent weighs too much. The pressure is then recorded as a function of time.

In addition, the gas inlet rate may be so controlled as to maintain the pressure directly proportional to the period of time elapsed during the recording of the weight of the vapor adsorbed, in accordance with Formulae 1, 2, and 3. This arrangement may be carried out by using the apparatus of Figure 3 which functions similarly to that described in Figure 1 except that recorder 45 is omitted and is replaced by a pressure controller 45A. Instead of the leak valve being set to admit gas at an arbitrary rate, the valve 32 is regulated so that pressure is proportional to the period of time elapsed. This is advantageously accomplished by the use of a regulating manometer or other pressure control device 45A that regulates the gas inlet rate so that the pressure is made directly proportional to the period of time elapsed.

The temperature in the liquid nitrogen thermostat bath must of necessity be accurate in any automatic adsorption isotherm process. In conventional manual operations it is not absolutely essential to maintain the temperature within strict limits since the temperature is measured each time an adsorption reading is taken, as the variable plotted for the isotherm is the fraction of the vapor pressure of the liquid nitrogen, i. e. $p/p_0$. In the automatic apparatus, the temperature in the thermostat may be advantageously controlled within a narrow range by the use of a regulating vapor pressure thermometer. A second alternative is illustrated in both drawings, i. e., $p/p_0$ is plotted by matching two resistances, 28 and 43, one in the mercury manometer 26 connected to the glass envelope 10, in which is located the adsorption sample, and the other in the vapor pressure thermometer 41, immersed in the liquid nitrogen bath 37.

In the apparatus arrangements employing the coil spring and beam balances, it is necessary that the equipment be protected from any form of vibration. The sensitivity of this apparatus demands a minimization of vibration on the system for maximum accuracy; hence the system should be substantially isolated from any vibration present in the operational environment. In this regard, it may be highly advantageous to provide means for viscous damping of the vibrations.

In place of the manometers, conventional pressure transducers, with a resistance bridge, wherein the resistance changes with the tension on the wires, may be used. In addition, the control valve used for the gas or vapor inlet and outlet control may be a mechanical valve operated by a motor. Or a capillary leak valve containing an internal platinum wire, the diameter of which is determined by the temperature of current flowing therethrough, may be used. In place of the beam balance, an electronic balance, a torsion balance, or a recording extensometer arrangement, e. g., a differential transformer, are satisfactory.

I claim:

1. An apparatus to obtain data for adsorption isotherms of finely divided and porous solids including the adsorption and desorption branches of the isotherms, comprising a vacuum-tight chamber with a gas passage, gravimetric means in said chamber which supports said solids, means to maintain that part of said chamber surrounding said solids at a substantially constant temperature, means to adjust said gas passage in such manner that during the passage of gas through said passage equilibrium is closely approximated in said chamber, means for controlling said last named means to adjust said gas passage in such manner that at least one of the variables consisting of the weight of the gas adsorbed by said solids and the pressure within the vacuum-tight chamber is a function of the time elapsed, and means to record at least one of said variables.

2. An apparatus to obtain data for adsorption isotherms of finely divided and porous solids, including the adsorption and desorption branches of the isotherms, comprising a vacuum-tight chamber with a gas passage, means to adjust said gas passage in such manner that during the passage of gas through said passage equilibrium is closely approximated in said chamber, gravimetric means in said chamber which supports said solids, means responsive to said gravimetric means to regulate said gas passage so that the weight of the gas adsorbed by said solids in the vacuum-tight chamber is directly proportional to the time elapsed, means to maintain the part of said chambers surrounding said solids at a substantially constant temperature, and means to record the pressure within the vacuum-tight chamber as a function of time.

3. The apparatus of claim 2 wherein the gravimetric means comprises a holder for the solids suspended from one side of a beam balance, and means at the second side of said balance for varying the weight of said second side at uniform rate.

4. The apparatus of claim 3 wherein the means responsive to said gravimetric means to regulate said gas passage comprises means for detecting movements in the second side of said balance, and means responsive to said detecting means for controlling the gas passage so that the weight of the gas adsorbed by said solids in the vacuum-tight chamber is directly proportional to the time elapsed.

5. The apparatus of claim 4 wherein the means to record the pressure within the vacuum-tight chamber comprises a manometer having a liquid leg in communication with said chamber, and means responsive to the liquid level in said leg to record the pressure in the chamber as a function of time.

6. An apparatus to obtain data for adsorption isotherms of finely divided and porous solids including the adsorption and desorption branches of the isotherms, comprising a vacuum-tight chamber with a gas passage, means to adjust said gas passage in such manner that during the passage of gas through said passage equilibrium is closely approximated in said chamber, gravimetric means in said chamber which supports said solids, means responsive to said gravimetric means to record the weight of the gas adsorbed in the vacuum-tight chamber as a function of time, means to measure the pressure within said vacuum-tight chamber, means responsive to said pressure measuring means to regulate said gas passage so that the pressure within the vacuum-tight chamber is directly proportional to the time elapsed, and means to maintain the part of said chamber surrounding said solids at a substantially constant temperature.

7. An apparatus to obtain data for adsorption isotherms of finely divided and porous solids including the adsorption and desorption branches of the isotherms, comprising a vacuum-tight chamber with a gas passage, gravimetric means in said chamber which supports said solids, means responsive to said gravimetric means to record the weight of the gas adsorbed in the vacuum-tight chamber as a function of time, means to maintain the part of said chamber surrounding said solids at a substantially constant temperature, means to record the pressure within the vacuum-tight chamber as a function of time, and means to regulate said gas passage so that the gas may pass therethrough at an arbitrarily fixed low rate so that equilibrium is closely approximated in said chamber.

8. The apparatus of claim 7 wherein the gravimetric means comprises a holder for the solids suspended by a connecting member from the lower part of a coil wire whose upper part is firmly secured.

9. The apparatus of claim 8 wherein the means responsive to said gravimetric means to record the weight of the gas adsorbed comprises a magnetic core forming a part of the member connecting the holder and the lower part of the coil wire, and means for detecting movements of said core to record the weight of the gas adsorbed as a function of time.

10. The apparatus of claim 9 wherein the means to record the pressure within the vacuum-tight chamber comprises a manometer having a liquid leg in communication with said chamber, and means responsive to the liquid level in said leg to record the pressure in the chamber as a function of time.

11. An apparatus to obtain data for adsorption isotherms of finely divided and porous solids, including the adsorption and desorption branches of the isotherms, comprising a vacuum-tight chamber with a gas passage, gravimetric means in said chamber which supports said solids, means to maintain the part of said chamber surrounding said solids at a substantially constant temperature, means to adjust said gas passage in such manner that during the passage of gas through said passage equilibrium is closely approximated in said chamber, means to adjust said gas passage in such manner that one of the variables consisting of the weight of the gas adsorbed by said solids and the pressure within the vacuum-tight chamber is directly proportional to time, and means to record one of said variables as a function of time, said recorded variable being that which is not varied in direct proportion to time by said means to adjust the gas passage.

12. Apparatus to obtain data for adsorption isotherms of finely divided and porous solids including the adsorption and desorption branches of the isotherms comprising a vacuum-tight chamber with a gas passage, gravimetric means in said chamber which supports said solids, means to maintain that part of said chamber surrounding said solids at a substantially constant temperature, means to adjust said gas passage in such manner that during the passage of gas through said passage equilibrium is closely approximated in said chamber, means for controlling said last named means to adjust said gas passage in such manner that pressure within the chamber and the weight of the gas adsorbed by said solids are a function of time, means responsive to said gravimetric means to record the weight of the gas adsorbed by said solids, and means to record the pressure within the vacuum-tight chamber.

References Cited in the file of this patent

FOREIGN PATENTS

| Number | Country | Date |
| --- | --- | --- |
| 339,120 | Germany | July 13, 1921 |

OTHER REFERENCES

Journal of Scientific Instruments, vol. 23, November 1946, pp. 259–264.